April 20, 1937.                L. LUDWIG                2,077,801
ELECTRIC OUTLET FOR PORTABLE ELECTRIC LAMPS AND OTHER FIXTURES
Filed June 30, 1936

INVENTOR.
Louis Ludwig
BY
ATTORNEYS.

Patented Apr. 20, 1937

2,077,801

UNITED STATES PATENT OFFICE 2,077,801

ELECTRIC OUTLET FOR PORTABLE ELECTRIC LAMPS AND OTHER FIXTURES

Louis Ludwig, Brooklyn, N. Y.

Application June 30, 1936, Serial No. 88,084

3 Claims. (Cl. 173—334)

The invention relates to electric outlets and particularly to an outlet suitable for use with a portable electric lamp. It has for its main object to provide a single or double outlet which may be attached directly on an electric cord at any place along its length. Another object is to provide an outlet of extremely simple and inexpensive construction having but few parts, none of which are easily broken or apt to get out of order. A further object is to provide means which will effectively prevent the accidental displacement of the electric cord from the outlet.

These and various other objects and advantages will be readily understood from the following description and from the accompanying drawing of preferred embodiments of the invention, in which, however, modifications may be made without departing from the scope of the appended claims. In the drawing:

Fig. 1 is a side view of a portable electric light to the cord of which an outlet fixture, made in accordance with the invention, has been attached;

Fig. 2 is a side view of this fixture;

Fig. 3 is a cross-sectional side view of Fig. 2, taken on line 3—3;

Figure 1:
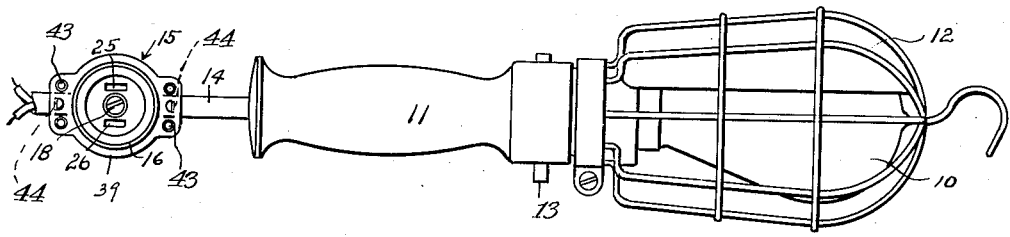
Figure 2:
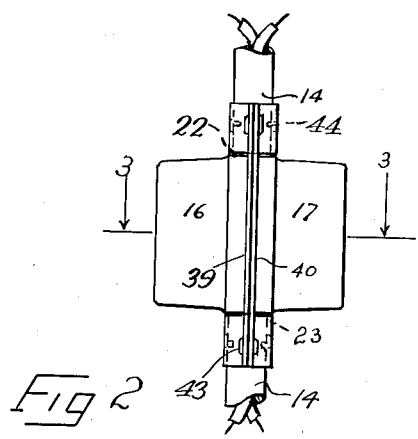
Figure 3:
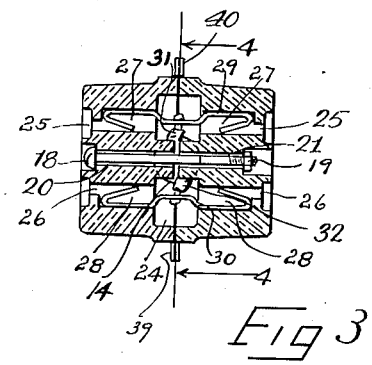
Figure 4:
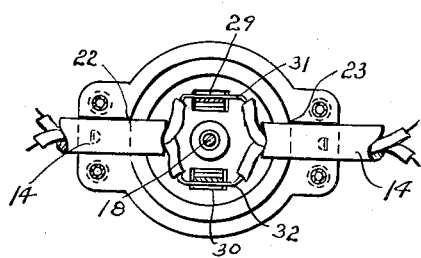
Fig. 4 is a view of a part of the fixture, taken on line 4—4 in Fig. 3.

Reference is now made to Figs. 1, 2, 3, 4 and 6 in which a portable lamp is shown at 10, its handle at 11, its wire guard at 12, its switch at 13 and its electric cord at 14. The invention resides in the electric outlet 15 which is secured to the cord 14 and connected with the wires contained therein. The outlet 15 consists of two parts 16 and 17 which are held together by means of a screw 18 and a nut 19, the screw passing through axial openings 20 and 21 formed in the two parts. Oppositely-disposed, semi-circular seats 22 and 23 are formed on the adjacent sides of the two parts so that, when assembled, circular openings will be formed for accommodating the cord 14, which in this particular case is of the heavy, rubber-covered type.

A recess 24 is formed by hollowing out the adjacent faces of the two parts, and each of the parts provided with rectangular openings 25 and 26 in their outer ends through which the contact prongs of an attachment plug may be inserted. Sockets 27 and 28 are formed back of the opening 25 and 26 and in these sockets double-ended contact springs 29 and 30 are contained. The wires 31 and 32, contained in the cord 14, are each stripped for a short distance and the stripped part soldered to the center part of the contact springs 29 and 30 as plainly illustrated in Figs. 3 and 4.

Figure 5:
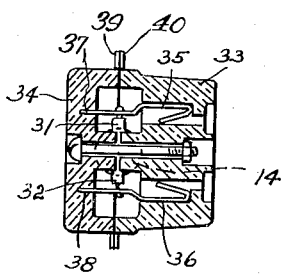
Fig. 5 is a cross-sectional side view showing a slightly modified fixture.

In Fig. 5 a single outlet is illustrated. The part 33 is similar to either of the parts 16 and 17, while the part 34 merely acts as a cap. In this embodiment the contact springs 35 and 36 are of single construction and the rear ends of these contact springs are nested in sockets 37 and 38 formed in the cap.

Figure 6:
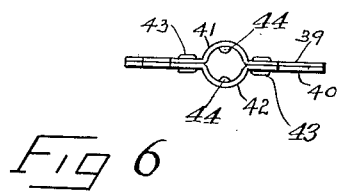
Fig. 6 is an end view of a clamp used to prevent the pulling out of the cord.

To prevent the cord 14 from being torn out or dislodged from the outlet, a clamp is employed. This consists of two sheet metal pieces 39 and 40 which are shaped as plainly indicated in Figs. 1 and 6 and provided with a circular opening in which the outlet fits. The ends of the clamp are bent to form sockets 41 and 42 in which the cord fits snuggly. The members are secured together by means of eyelets 43 and prongs 44 are sheared from the members and pressed down in the insulation of the cord. These prongs effectively prevent the cord from being pulled out, even under the hardest usage.

It will be seen that this outlet, whether of the single or double type, may readily be attached to the wires of any electric cord and it will be evident that it is particularly well adapted for use with a portable lamp, in that it enables the operator to plug in various electric tools, such as drills, grinders and the like, and at the same time have the benefit of the light.

While the parts 16 and 17 of which the outlet is constructed may be made of any kind of insulating material, I preferably make them of soft rubber so that the cord may be clamped tightly in the seats 22 and 23 when the parts are secured together. This also tends to make the whole device less likely to break, particularly when used in places, such as garages, where they get exceptionally hard usage.

Having described the invention and its objects, what I claim as new and wish to protect by Letters Patent is:—

1. An outlet of the class described comprising two co-acting insulating parts; a recess formed between the inner faces of said parts; two oppositely-disposed semi-circular seats formed in each of the parts to form circular openings for the reception of an electric cord; sockets extending from said center recess and terminating in rectangular openings for the reception of the contact prongs of an electric connector; spring contacts contained in the said sockets; each of said contacts having a part extending across the center recess to which parts the electric wires of the cord on which the device is attached may be secured; means for clamping the two parts together; and a clamp extending around the outlet for clamping the wires secured thereto to prevent their displacement.

2. An outlet of the class described comprising two co-acting insulating parts; a recess formed between the inner faces of said parts; two oppositely-disposed semi-circular seats formed in each of the parts to form circular openings for the reception of an electric cord; sockets extending from said center recess and terminating in rectangular openings for the reception of the contact prongs of an electric connector; spring contacts contained in the said sockets; each of said contacts having a part extending across the center recess to which parts the electric wires of the cord on which the device is attached may be secured; means for clamping the two parts together; and a clamp extending around the outlet for clamping the wires secured thereto; said clamp having a plurality of prongs engaged in the insulation of the wires to prevent their displacement.

3. An outlet of the class described comprising two co-acting insulating parts made of resilient material; a recess formed between the inner faces of said parts; two oppositely-disposed semi-circular seats formed in each of the parts to form circular openings for the reception of an electric cord; sockets extending from said center recess and terminating in rectangular openings for the reception of the contact prongs of electric connectors; double-ended spring contacts contained in the said sockets; the electric wires of the cord on which the device is attached secured to the center part of said spring contacts and within the recess; means for clamping the two parts together; and a clamp extending around the outlet for clamping the wires secured thereto to prevent their displacement.

LOUIS LUDWIG.